United States Patent
Dong (10) Patent No.: US 8,698,448 B2
(45) Date of Patent: Apr. 15, 2014

(54) POWER SUPPLY METHOD, POWER SUPPLY DEVICE, AND BASE STATION

(71) Applicant: Huawei Technologies Co., Ltd., Guangdong (CN)

(72) Inventor: Guangyu Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/625,310

(22) Filed: Sep. 24, 2012

(65) Prior Publication Data

US 2013/0221896 A1 Aug. 29, 2013

Related U.S. Application Data

(63) Continuation of application No. PCT/CN2012/078982, filed on Jul. 20, 2012.

(30) Foreign Application Priority Data

Feb. 29, 2012 (CN) .......................... 2012 1 0050087

(51) Int. Cl.
*H01M 10/44* (2006.01)
*H02J 7/00* (2006.01)

(52) U.S. Cl.
CPC ............ *H02J 7/0054* (2013.01); *H02J 7/0021* (2013.01); *H02J 7/0003* (2013.01)
USPC ............................ 320/101; 320/117; 320/121

(58) Field of Classification Search
USPC ......................................... 320/101, 117, 121
See application file for complete search history.

(56) References Cited

U.S. PATENT DOCUMENTS

| 2008/0111508 A1* | 5/2008 | Dasgupta et al. ............. 318/139 |
| 2010/0308765 A1* | 12/2010 | Moore et al. .................. 320/103 |
| 2011/0149611 A1* | 6/2011 | Moussaoui et al. ........ 363/21.04 |

(Continued)

FOREIGN PATENT DOCUMENTS

| CN | 101170205 A | 4/2008 |
| CN | 201286022 Y | 8/2009 |

(Continued)

OTHER PUBLICATIONS

International Search Report & Written Opinion issued in corresponding PCT application No. PCT/CN2012/078982, Nov. 22, 2012, total 18 pages.

(Continued)

*Primary Examiner* — M'Baye Diao
(74) *Attorney, Agent, or Firm* — Slater & Matsil, L.L.P.

(57) ABSTRACT

Embodiments of the present invention, relating to the field of communications, provide a power supply method, a power supply device, and a base station, which, while satisfying use requirements of a backup power source, prolong the life cycle of a lead acid battery, reduce the set capacity of the original lead acid battery, and thereby reduce investment costs. The method includes: receiving currents supplied by a power generation apparatus, distributing the currents supplied by the power generation apparatus to a load and a lithium ion battery to ensure normal running of the load and enable the lithium ion battery to be charged, and after the lithium ion battery is fully charge, distributing the currents supplied by the power generation apparatus to the lead acid battery so that the lead acid battery is charged.

17 Claims, 4 Drawing Sheets

(56) References Cited

U.S. PATENT DOCUMENTS

| | | | |
|---|---|---|---|
| 2012/0031890 A1* | 2/2012 | Han et al. | 219/209 |
| 2012/0293002 A1 | 11/2012 | Ye et al. | |
| 2013/0249468 A1* | 9/2013 | Bajjuri et al. | 320/104 |

FOREIGN PATENT DOCUMENTS

| | | |
|---|---|---|
| CN | 102044989 A | 5/2011 |
| CN | 102148531 A | 8/2011 |
| CN | 102338340 A | 2/2012 |
| CN | 102593907 A | 7/2012 |
| JP | 2010115026 A | 5/2010 |

OTHER PUBLICATIONS

First Chinese Office Action received on Chinese Application No. 201210050087.4, mailed Jul. 18, 2013, 19 pages. (Partial Translation).

* cited by examiner

POWER SUPPLY METHOD, POWER SUPPLY DEVICE, AND BASE STATION

CROSS-REFERENCE TO RELATED APPLICATIONS

This application is a continuation of International Application No. PCT/CN2012/078982, filed on Jul. 20, 2012, which claims priority to Chinese Patent Application No. 201210050087.4, filed on Feb. 29, 2012, both of which are hereby incorporated by reference in their entireties.

FIELD OF THE INVENTION

The present invention relates to the field of communications, and in particular, to a power supply method, a power supply device, and a base station.

BACKGROUND OF THE INVENTION

A base station is an indispensable transceiver apparatus in modern communication. In some remote and undeveloped regions, mains power supply is poor, and power interruption frequently occurs, resulting in working suspension of the base station. Therefore, a power generation system and a backup power system need to be provided for base stations in the regions where the mains power supply is poor or no mains power supply is available. In the prior art, oil machine power generation, solar power generation, or wind power generation is generally used as a power generation system to supply power to base stations. The solar power generation is the most environmentally friendly, and achieves more stable power generation.

An existing base station typically uses multiple sets of solar photovoltaic modules for power generation, and uses a lead acid battery as a backup power source for storing electrical energy, and uses an electrical energy controller to schedule and control the entire power supply device.

In the case of illumination, the solar photovoltaic module converts solar energy into electrical energy to supply power to a load of the base station, and meanwhile charging the lead acid battery. In the case of no illumination, the lead acid battery supplies power to the load of the base station.

In the prior art, in-depth charge and discharge fails to be achieved for the lead acid battery. If the in-depth charge and discharge is performed on the lead acid battery, the life cycle of the battery is greatly shortened, thereby shortening the maintenance duration and increasing the maintenance cost. In addition, the charge speed of the lead acid battery is very low. If a power failure occurs during charge, the lead acid battery fails to function as a backup power source. A base station generally requires that a backup power source be used for three to five days. In-depth charge and discharge cannot be achieved, and therefore, available electrical energy in the battery is restricted. To satisfy the requirement, the base station must be provided with a large-capacity lead acid battery, which increases investment costs. However, the current base station is not provided with other power systems, and therefore the load of the base station has to suspend working when the electrical energy in the lead acid battery is exhausted.

SUMMARY OF THE INVENTION

Embodiments of the present invention provide a power supply method, a power supply device, and a base station, which, while satisfying use requirements of a backup power source, prolong the life cycle of a lead acid battery, reduce the set capacity of the original lead acid battery, and thereby reduce investment costs.

In order to achieve the foregoing object, the embodiments of the present invention adopt the following technical solutions:

In one aspect, a power supply method is provided, including:

receiving currents supplied by a power generation apparatus, transferring currents required by a load among the currents to the load, and transferring remaining currents of the currents except the currents required by the load among the currents to a lithium ion battery so that the lithium ion battery is charged;

monitoring a voltage of the lithium ion battery, and when the voltage of the lithium ion battery increases to a first preset voltage, sending a switching signal to a zero-time switching unit connected to the lithium ion battery and a lead acid battery to enable the zero-time switching unit to non-intermittently switch an energy storage unit connected to an electrical energy controller from the lithium ion battery to the lead acid battery, and enable the electrical energy controller to transfer the remaining currents to the lead acid battery so that the lead acid battery is charged, where the first preset voltage is the voltage of the lithium ion battery corresponding to 95% to 100% of the capacity of the lithium ion battery;

monitoring the currents supplied by the power generation apparatus, and when the currents supplied by the power generation apparatus are zero, sending a switching signal to the zero-time switching unit to enable the zero-switching unit to non-intermittently switch the energy storage unit connected to the electrical energy controller from the lead acid battery to the lithium ion battery, so that a current provided by the lithium ion battery is transferred to the load; and monitoring the voltage of the lithium ion battery, and when the voltage of the lithium ion battery decreases to a second preset voltage, sending a switching signal to the zero-time switching unit to enable the zero-time switching unit to non-intermittently switch the energy storage unit connected to the electrical energy controller from the lithium ion battery to the lead acid battery, so that a current provided by the lead acid battery is transferred to the load, where the second preset voltage is the voltage of the lithium ion battery corresponding to 0% to 20% of the capacity of the lithium ion battery.

In another aspect, a power supply device is provided, including a lead acid battery and further including:

an electrical energy control unit, configured to receive currents supplied by a power generation apparatus, distribute the currents supplied by the power generation apparatus to a load and a lithium ion battery to ensure normal running of the load and enable the lithium ion battery to be charged, and when the lithium ion battery is fully charged, distribute the currents supplied by the power generation apparatus to the lead acid battery so that the lead acid battery is charged; where when the electrical energy control unit detects that the currents supplied by the power generation apparatus are interrupted, the electrical energy control module is further configured to first transfer a current provided by the lithium ion battery to the load, and transfer a current provided by the lead acid battery to the load when the lithium ion battery is exhausted; and the lithium ion battery.

The electrical energy control unit is connected to the load of the base station, a monitoring unit, and a zero-time switching unit; the monitoring unit is further connected to the zero-time switching unit and the lithium ion battery; and the zero-time switching unit is further connected to the lithium ion battery and the lead acid battery.

In another aspect, a base station is further provided, including:

the power supply device, configured to supply currents to a load of the base station to ensure normal running of the base station; and a transceiver device, configured to receive or transmit a signal; and a control device, configured to control the transceiver device to receive or transmit a signal.

According to the power supply method, the power supply device, and the base station provided in the embodiments of the present invention, a lithium ion battery that can be fast charged and discharged and has large discharge depth is added, which reduces the charge and discharge times for a lead acid battery. This prolongs the life cycle of the lead acid battery while satisfying use requirements of a backup power source, reduces the set capacity of the original lead acid battery, and thereby reduces investment costs.

BRIEF DESCRIPTION OF THE DRAWINGS

To illustrate the technical solutions in the embodiments of the present invention or in the prior art more clearly, the following briefly describes the accompanying drawings required for describing the embodiments. Apparently, the accompanying drawings in the following descriptions show merely some embodiments of the present invention, and persons of ordinary skill in the art can derive other drawings from the accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
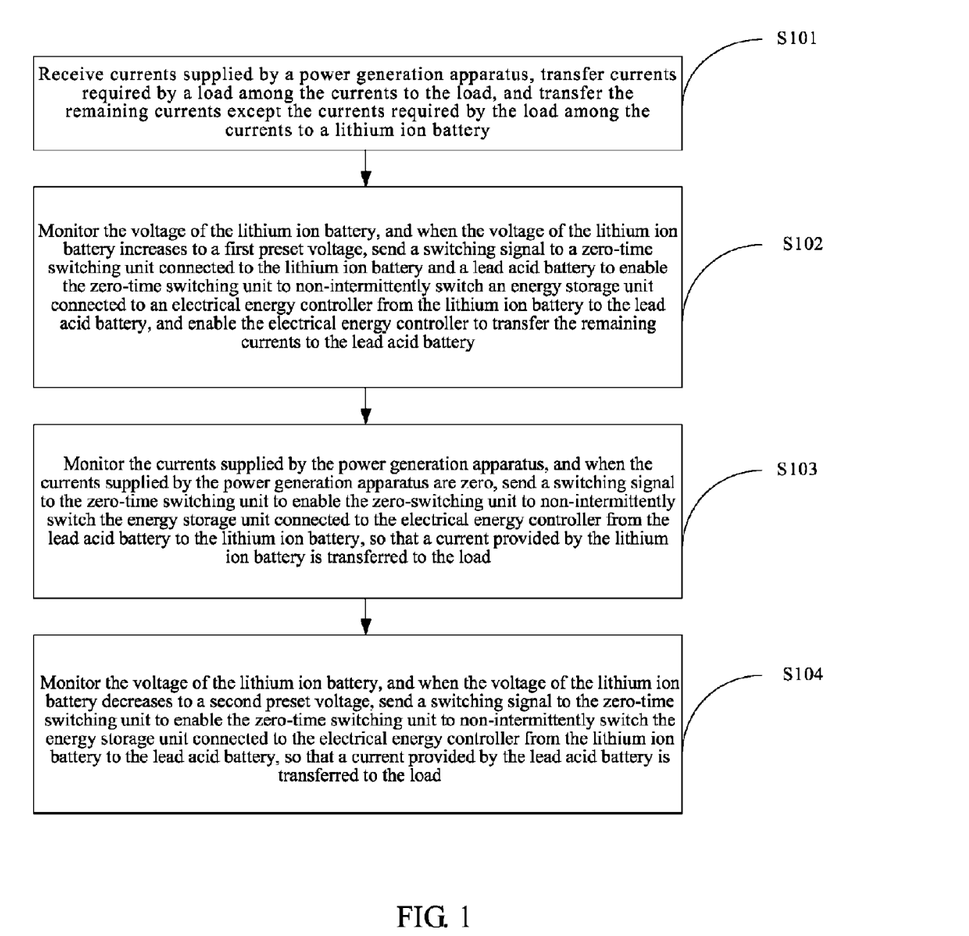
FIG. 1 is a first schematic flow chart of a power supply method according to an embodiment of the present invention.

The present invention provides a power supply method, as shown in FIG. 1, including:

S101. Receive currents supplied by a power generation apparatus, transfer currents required by a load among the currents to the load, and transfer the remaining currents except the currents required by the load among the currents to a lithium ion battery so that the lithium ion battery is charged.

S102. Monitor the voltage of the lithium ion battery, and when the voltage of the lithium ion battery increases to a first preset voltage, send a switching signal to a zero-time switching unit connected to the lithium ion battery and a lead acid battery to enable the zero-time switching unit to non-intermittently switch an energy storage unit connected to an electrical energy controller from the lithium ion battery to the lead acid battery, and enable the electrical energy controller to transfer the remaining currents to the lead acid battery so that the lead acid battery is charged, where the first preset voltage is the voltage of the lithium ion battery corresponding to 95% to 100% of the capacity of the lithium ion battery.

S103. Monitor the currents supplied by the power generation apparatus, and when the currents supplied by the power generation apparatus are zero, send a switching signal to the zero-time switching unit to enable the zero-switching unit to non-intermittently switch the energy storage unit connected to the electrical energy controller from the lead acid battery to the lithium ion battery, so that a current provided by the lithium ion battery is transferred to the load.

S104. Monitor the voltage of the lithium ion battery, and when the voltage of the lithium ion battery decreases to a second preset voltage, send a switching signal to the zero-time switching unit to enable the zero-time switching unit to non-intermittently switch the energy storage unit connected to the electrical energy controller from the lithium ion battery to the lead acid battery, so that a current provided by the lead acid battery is transferred to the load, where the second preset voltage is the voltage of the lithium ion battery corresponding to 0% to 20% of the capacity of the lithium ion battery.

According to the power supply method provided in this embodiment, a lithium ion battery that can be fast charged and discharged and has large discharge depth is added, which reduces the charge and discharge times for a lead acid battery. This prolongs the life cycle of the lead acid battery while satisfying use requirements of a backup power source, reduces the set capacity of the original lead acid battery, and thereby reduces investment costs.

Embodiment 2

Figure 2:
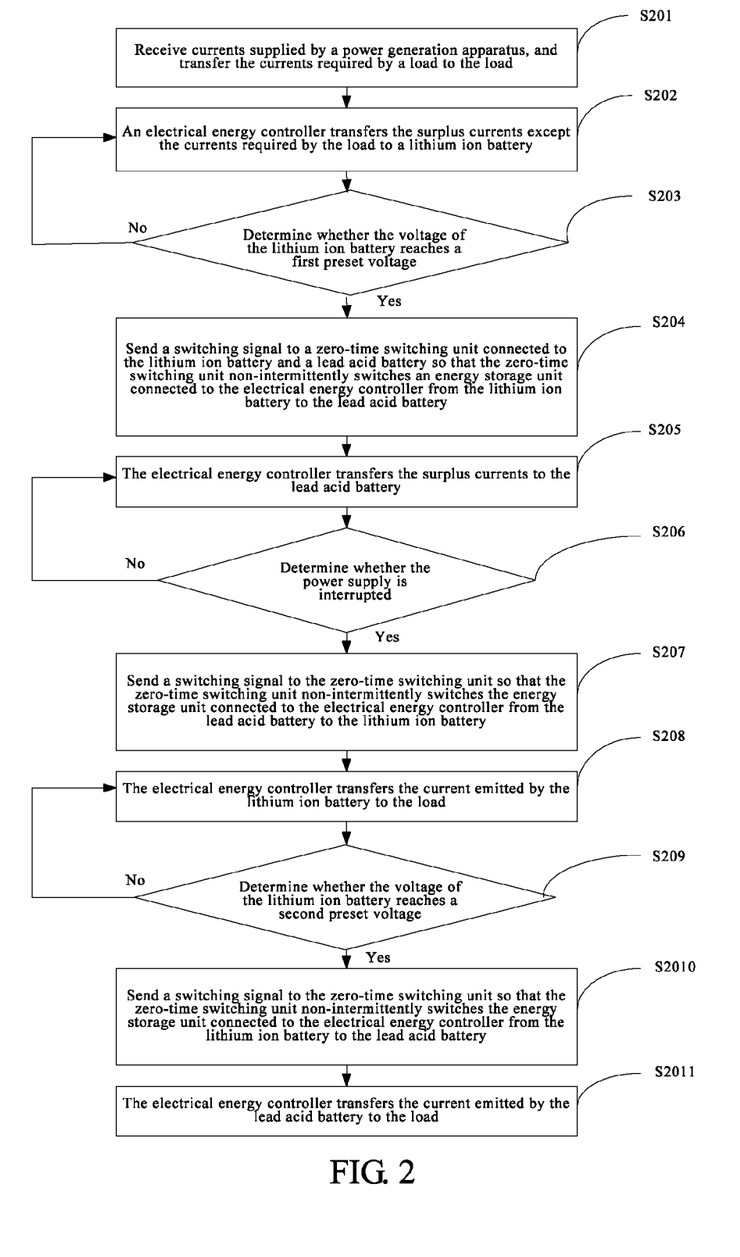
FIG. 2 is a second schematic flow chart of a power supply method according to an embodiment of the present invention.

The present invention provides a power supply method, including a charge process and a discharge process. As shown in FIG. 2, the charge process includes:

S201. Receive currents supplied by a power generation apparatus, and transfer currents required by a load among the currents to the load.

Specifically, a power supply device receives the currents supplied by the power generation apparatus by using an electrical energy controller, and transfers the currents required by the load among the received currents to the load by using a cable to ensure normal running of a device. Certainly, the currents required by the load are not fixed, and need to be determined according to the condition of the load.

The currents supplied by the power generation apparatus include: currents generated using solar energy, currents generated using thermal energy from combustion of fuel, electrical energy generated using wind energy, and/or currents supplied by the mains. To be specific, the received currents may include any one of the four types of currents, and may also be a combination of any two or three types of the currents, or a combination of the four types of currents.

S202. The electrical energy controller transfers the remaining currents except the currents required by the load among the currents to a lithium ion battery so that the lithium ion battery is charged.

S203. Monitor the voltage of the lithium ion battery, and determine whether the voltage of the lithium ion battery reaches a first preset voltage. When the voltage of the lithium ion battery increases to the first preset voltage, perform step S204; when the voltage of the lithium ion battery does not increases to the first preset voltage, perform step S202. The first preset voltage is the voltage of the lithium ion battery corresponding to 95% to 100% of the capacity of the lithium ion battery.

S204: Send a switching signal to a zero-time switching unit connected to the lithium ion battery and a lead acid battery to enable the zero-time switching unit to non-intermittently switch an energy storage unit connected to the electrical energy controller from the lithium ion battery to the lead acid battery.

S205. The electrical energy controller transfers the remaining currents to the lead acid battery. After being fully charged, the lead acid battery enters the standby state, and the remaining currents are still transferred to the lead acid battery to maintain it in the floating charge state.

As shown in FIG. 2, the discharge process includes:

S206. Monitor the currents supplied by the power generation apparatus, determine whether the power supply is interrupted according to whether the currents supplied by the power generation apparatus are zero; when the currents supplied by the power generation apparatus are zero, perform step S207; when the currents supplied by the power generation apparatus are not zero, perform step S205.

S207. Send a switching signal to the zero-time switching unit to enable the zero-time switching unit to non-intermittently switch the energy storage unit connected to the electrical energy controller from the lead acid battery to the lithium ion battery.

S208. The electrical energy controller transfers a current provided by the lithium ion battery to the load.

S209. Monitor the voltage of the lithium ion battery, and determine whether the voltage of the lithium ion battery decreases to a second preset voltage. When the voltage of the lithium ion battery decreases to the second preset voltage, perform step S2010; when the voltage of the lithium ion battery does not decrease to the second preset voltage, perform step S208. The second preset voltage is the voltage of the lithium ion battery corresponding to 0% to 20% of the capacity of the lithium ion battery.

S2010. Send a switching signal to the zero-time switching unit to enable the zero-time switching unit to non-intermittently switch the energy storage unit connected to the electrical energy controller from the lithium ion battery to the lead acid battery.

S2011. The electrical energy controller transfers a current provided by the lead acid battery to the load.

A lithium ion battery has advantages of fast charge, more charge and discharge times, a long life cycle, and large discharge depth. Therefore, a lithium ion battery is added based on the current lead acid battery. This greatly shortens the charge time for a backup power source and improves the emergency-handling capability. In addition, in the case of power interruption, the lithium ion battery is preferentially used, and the lead acid battery is not used before the electrical energy of the lithium ion battery is exhausted. In this way, in the case of short-period power interruption, a power supply requirement may be satisfied by using only the lithium ion battery, thereby reducing the use frequency of the lead acid battery, prolonging the life cycle of the lead acid battery, and increasing the maintenance duration of the power supply device. Moreover, a combination of the lithium ion battery and the lead acid battery may greatly reduce the set capability of the lead acid battery, thereby reducing investment costs.

Further, the zero-time switching unit is used to perform switching between the lithium ion battery and the lead acid battery. Therefore, when the lithium ion battery is exhausted, a power supply unit is non-intermittently switched from the lithium ion battery to the lead acid battery, thereby enabling the backup power source to constantly supply power to the load, and ensuring stable power supply.

In this embodiment, the lead acid battery may be an Absorptive Glass Mat, absorptive glass mat (AGM) type or GEL (gel) type lead acid battery, and the lithium ion battery may be replaced with another type of battery that can be fast charged, and has many charge and discharge times, and large discharge depth.

The method may be applied to a communication base station, and may also be applied to other devices requiring a backup power source.

According to the power supply method provided in this embodiment, a lithium ion battery that can be fast charged and discharged and has large discharge depth is added, which reduces the charge and discharge times for a lead acid battery. This prolongs the life cycle of the lead acid battery while satisfying use requirements of a backup power source, reduces the set capacity of the original lead acid battery, and thereby reduces investment costs.

Embodiment 3

Figure 3:
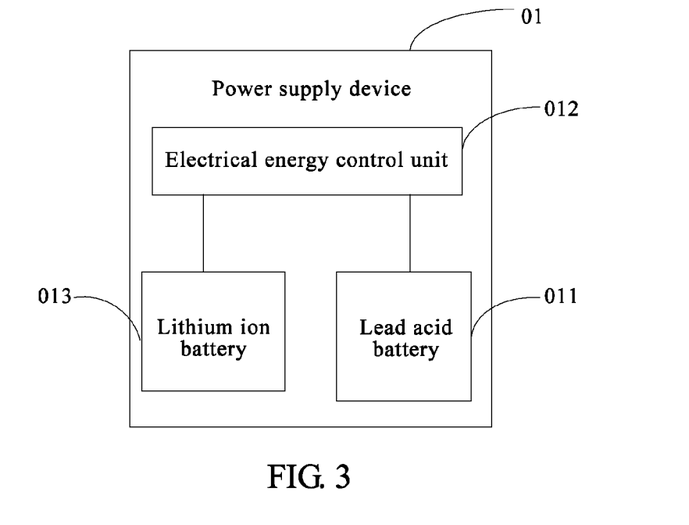
FIG. 3 is a first schematic structural diagram of a power supply device according to an embodiment of the present invention.

The present invention provides a power supply device 01, including a lead acid battery 011, and as shown in FIG. 3, further including:

an electrical energy control unit 012, configured to receive currents supplied by a power generation apparatus, distribute the currents supplied by the power generation apparatus to a load and a lithium ion battery to ensure normal running of the load and enable the lithium ion battery to be charged, and when the lithium ion battery is fully charged, distribute the currents supplied by the power generation apparatus to the lead acid battery so that the lead acid battery is charged; where when the electrical energy control unit detects that the currents supplied by the power generation apparatus are interrupted, the electrical energy control module is further configured to first transfer a current provided by the lithium ion battery to the load, and then transfer a current provided by the lead acid battery to the load when the lithium ion battery is exhausted; and the lithium ion battery 013.

Figure 4:
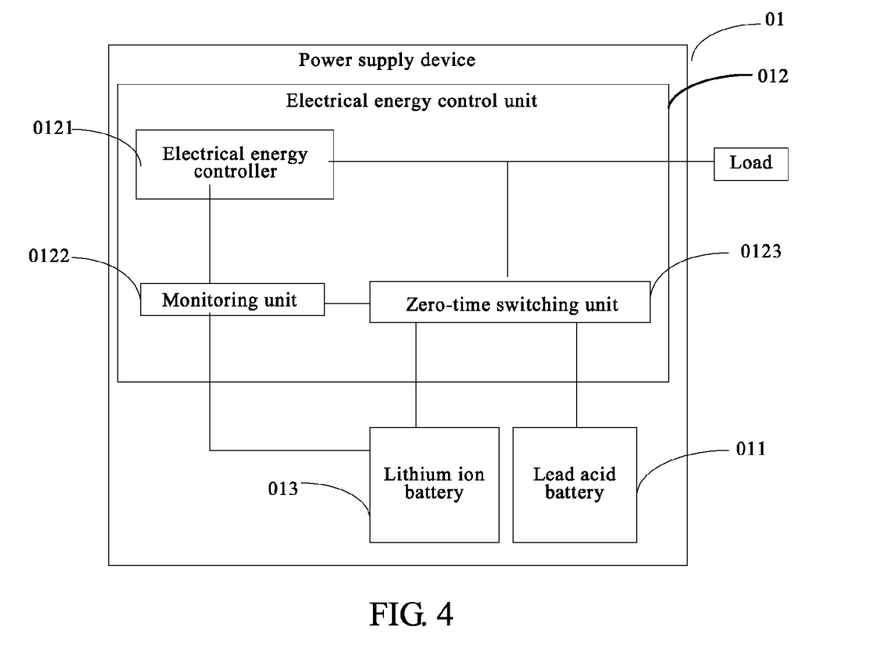
FIG. 4 is a second schematic structural diagram of a power supply device according to an embodiment of the present invention.

Further, as shown in FIG. 4, the electrical energy control unit 012 includes an electrical energy controller 0121, a monitoring unit 0122, and a zero-time switching unit 0123.

The electrical energy controller 0121 is configured to receive currents supplied by the power generation apparatus, transfer currents required by the load among the currents to the load, and transfer the remaining currents except the currents required by the load among the currents to the lithium ion battery 013 so that the lithium ion battery 013 is charged.

The monitoring unit 0122 is configured to monitor the voltage of the lithium ion battery 013, and when the voltage of the lithium ion battery 013 increases to a first preset voltage, send a switching signal to the zero-time switching unit 0123 connected to the lithium ion battery 013 and the lead acid battery 011 to enable the zero-time switching unit 0123 to non-intermittently switch an energy storage unit connected to the electrical energy controller 0121 from the lithium ion battery 013 to the lead acid battery 011, and enable the electrical energy controller 0121 to transfer the remaining currents to the lead acid battery 011 so that the lead acid battery 011 is charged, where the first preset voltage is the voltage of the lithium ion battery 013 corresponding to 95% to 100% of the capacity of the lithium ion battery 013.

The monitoring unit 0122 is further configured to monitor the currents supplied by the power generation apparatus, and when the currents supplied by the power generation apparatus are zero, send a switching signal to the zero-time switching unit 0123 to enable the zero-switching unit 0123 to non-intermittently switch the energy storage unit connected to the electrical energy controller 0121 from the lead acid battery 011 to the lithium ion battery 013, so that a current provided by the lithium ion battery 013 is transferred to the load.

The monitoring unit 0122 is further configured to monitor the voltage of the lithium ion battery 013, and when the voltage of the lithium ion battery 013 decreases to a second preset voltage, send a switching signal to the zero-time switching unit 0123 to enable the zero-time switching unit 0123 to non-intermittently switch the energy storage unit connected to the electrical energy controller 0121 from the lithium ion battery 013 to the lead acid battery 011, so that a current provided by the lead acid battery 011 is transferred to the load, where the second preset voltage is the voltage of the lithium ion battery 013 corresponding to 0% to 20% of the capacity of the lithium ion battery 013.

The zero-time switching unit 0123 is configured to non-intermittently switch the energy storage unit connected to the electrical energy controller 0121 between the lithium ion battery 013 and the lead acid battery 011.

As shown in FIG. 4, the electrical energy controller 0121 is connected to the load of the base station, the monitoring unit 0122, and the zero-time switching unit 0123; the monitoring unit 0122 is connected to the zero-time switching unit 0123 and the lithium ion battery 013; and the zero-time switching unit 0123 is connected to the lithium ion battery 013 and the lead acid battery 011.

Figure 5:
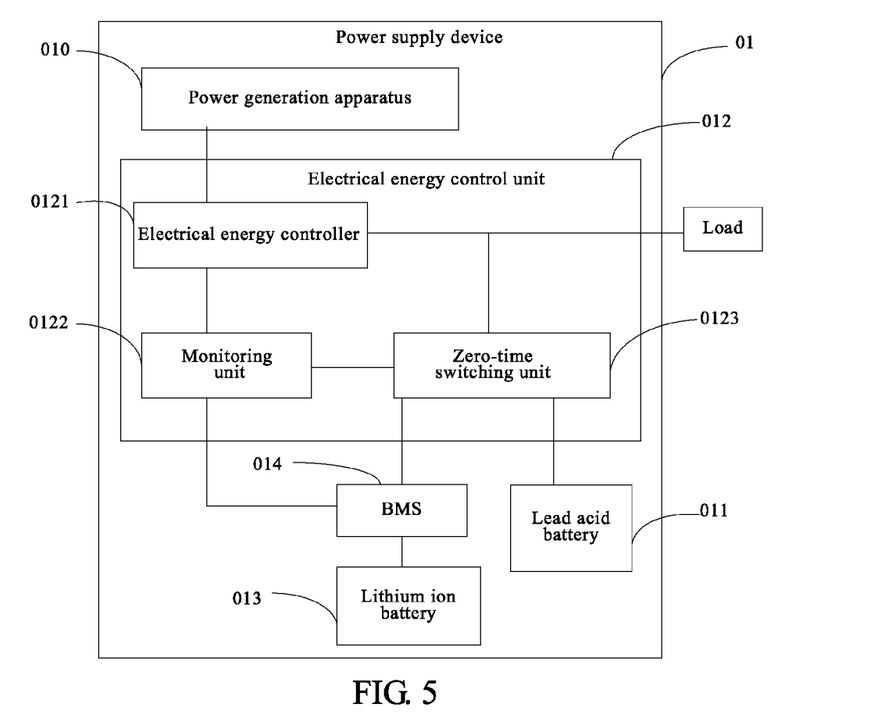
FIG. 5 is a third schematic structural diagram of a power supply device according to an embodiment of the present invention.

Further, as shown in FIG. 5, the power supply device further includes: a power generation apparatus 010, configured to supply electrical energy to the load, where the power generation apparatus 010 includes: a solar photovoltaic module, a wind power generation module, an oil machine power generation module, and/or a mains power supply module; to be specific, the power generation apparatus 010 may include any one of the four modules, and may also be a combination of any two or three of the modules, or a combination of the four modules, the solar photovoltaic module is configured to generate currents using solar energy; the wind power generation module is configured to generate currents using wind energy; the oil machine power generation module is configured to generate currents using thermal energy from combustion of fuel; and the mains power supply module is configured to receive currents supplied by the mains; and a battery management system (BMS) (Battery Management System) 014, configured to protect the lithium ion battery 013. The lithium ion battery includes a plurality of monomer batteries. During charge, the case of charge non-equalization of the monomer batteries often occurs. However, the BMS is capable of enabling charge equalization of the monomer batteries in the lithium ion battery 013, and preventing damage caused by over-charge, over-discharge and over-temperature of the lithium ion battery 013, thereby prolonging the life cycle of the battery.

As shown in FIG. 5, the power generation apparatus 010 is connected to the electrical energy controller 0121; and the BMS 014 is connected to the monitoring unit 0122, the zero-time switching unit 0123, and the lithium ion battery 013.

In this embodiment, the lead acid battery may be an Absorptive Glass Mat, absorptive glass mat (AGM) type or GEL (gel) type lead acid battery, and the lithium ion battery may be replaced with another type of battery that can be fast charged, and has many charge and discharge times, and large discharge depth.

The power supply device provided in this embodiment may be applied to a communication base station, and may also be applied to other devices requiring a backup power source.

According to the power supply device provided in this embodiment, a lithium ion battery is added, which prevents floating charge for a lead acid battery, prolongs the life cycle of the lead acid battery, reduces the set capacity of the original lead acid battery, and thereby reduces operation costs. In addition, the power source for power supply is non-intermittently switched from the lithium ion battery to the lead acid battery when the lithium ion battery is exhausted, preventing the power supply from interruption, and thereby improving the reliability of the power supply device.

Figure 6:
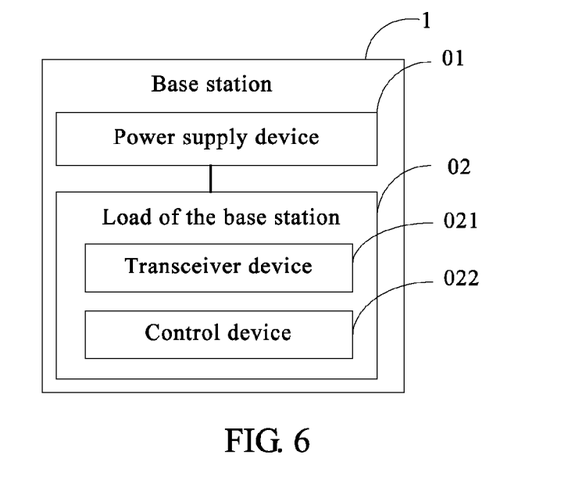
FIG. 6 is a schematic structural diagram of a base station according to an embodiment of the present invention.

An embodiment of the present invention further provides a base station 1, as shown in FIG. 6, including: the power supply device 01 described above, configured to supply electrical energy to the base station to ensure normal running of the base station.

The base station 1 further includes a load 02 of the base station, including: a transceiver device 021, configured to receive or transmit a signal; and a control device 022, configured to control the transceiver device to receive or transmit a signal.

Adding of a lithium ion battery greatly shortens the charge time for a backup power source and improves the emergency-handling capability. In addition, in the case of power interruption, the lithium ion battery is preferentially used, and the lead acid battery is not used before the electrical energy of the lithium ion battery is exhausted. In this way, in the case of short-period power interruption, a power supply requirement may be satisfied by using only the lithium ion battery, thereby reducing the use frequency of the lead acid battery, prolonging the life cycle of the lead acid battery, and increasing the maintenance duration of the power supply device. Moreover, a combination of the lithium ion battery and the lead acid battery may greatly reduce the set capability of the lead acid battery, thereby reducing investment costs.

Further, the zero-time switching unit is configured to perform switching between the lithium ion battery and the lead acid battery. Therefore, when the lithium ion battery is exhausted, a power supply unit is non-intermittently switched from the lithium ion battery to the lead acid battery, thereby enabling the backup power source to constantly supply power to the load of the base station, and ensuring stable running of the base station.

The foregoing descriptions are merely exemplary embodiments of the present invention, but not intended to limit the present invention. Any variation or replacement made by persons skilled in the art without departing from the spirit of the present invention shall fall within the protection scope of the present invention. Therefore, the protection scope of the present invention shall be subject to the protection scope of the claims.

The invention claimed is:

1. A power supply method, comprising:
receiving currents supplied by a power generation apparatus, transferring currents required by a load among the currents to the load, and transferring remaining currents except the currents required by the load among the currents to a lithium ion battery so that the lithium ion battery is charged;

monitoring a voltage of the lithium ion battery, and when the voltage of the lithium ion battery increases to a first preset voltage, sending a switching signal to a zero-time switching unit connected to the lithium ion battery and a lead acid battery to enable the zero-time switching unit to non-intermittently switch an energy storage unit connected to an electrical energy controller from the lithium ion battery to the lead acid battery, and enable the electrical energy controller to transfer the remaining currents to the lead acid battery so that the lead acid battery is charged, wherein the first preset voltage is the voltage of the lithium ion battery corresponding to 95% to 100% of the capacity of the lithium ion battery;

monitoring the currents supplied by the power generation apparatus, and when the currents supplied by the power generation apparatus are zero, sending a switching signal to the zero-time switching unit to enable a zero-switching unit to non-intermittently switch the energy storage unit connected to the electrical energy controller from the lead acid battery to the lithium ion battery, so that a current provided by the lithium ion battery is transferred to the load; and monitoring the voltage of the lithium ion battery, and when the voltage of the lithium ion battery decreases to a second preset voltage, sending a switching signal to the zero-time switching unit to enable the zero-time switching unit to non-intermittently switch the energy storage unit connected to the electrical energy controller from the lithium ion battery to the lead acid battery, so that a current provided by the lead acid battery is transferred to the load, wherein the second preset voltage is the voltage of the lithium ion battery corresponding to 0% to 20% of the capacity of the lithium ion battery.

2. The power supply method according to claim 1, wherein before the receiving the currents supplied by the power generation apparatus, the method further comprises:
generating currents by the power generation apparatus.

3. The power supply method according to claim 1, wherein the currents supplied by the power generation apparatus comprise:
currents generated using solar energy, currents generated using thermal energy from combustion of fuel, electrical energy generated using wind energy, or currents supplied by the mains.

4. A power supply device, comprising:
a lead acid battery;
a lithium ion battery; and
an electrical energy control unit, configured to receive currents supplied by a power generation apparatus, distribute the currents supplied by the power generation apparatus to a load and the lithium ion battery to ensure normal running of the load and to enable the lithium ion battery to be charged, and when the lithium ion battery is fully charged, to distribute the currents supplied by the power generation apparatus to the lead acid battery so that the lead acid battery is charged;
wherein when the electrical energy control unit detects that the currents supplied by the power generation apparatus are interrupted, the electrical energy control unit is further configured to first transfer a current provided by the lithium ion battery to the load, and then transfer a current provided by the lead acid battery to the load when the lithium ion battery is exhausted:
wherein the electrical energy control unit comprises:

an electrical energy controller, configured to receive the currents supplied by the power generation apparatus, transfer currents required by the load among the currents to the load, and transfer remaining currents except the currents required by the load among the currents to the lithium ion battery so that the lithium ion battery is charged; and a monitoring unit, configured to monitor a voltage of the lithium ion battery, and when the voltage of the lithium ion battery increases to a first preset voltage, send a switching signal to a zero-time switching unit connected to the lithium ion battery and the lead acid battery to enable the zero-time switching unit to non-intermittently switch an energy storage unit connected to the electrical energy controller from the lithium ion battery to the lead acid battery, and enable the electrical energy controller to transfer remaining currents to the lead acid battery so that the lead acid battery is charged, wherein the first preset voltage is the voltage of the lithium ion battery corresponding to 95% to 100% of the capacity of the lithium ion battery;

wherein the monitoring unit is further configured to monitor the currents supplied by the power generation apparatus, and when the currents supplied by the power generation apparatus are zero, send a switching signal to the zero-time switching unit to enable a zero-switching unit to non-intermittently switch the energy storage unit connected to the electrical energy controller from the lead acid battery to the lithium ion battery, so that the current provided by the lithium ion battery is transferred to the load;

wherein the monitoring unit is further configured to monitor the voltage of the lithium ion battery, and when the voltage of the lithium ion battery decreases to a second preset voltage, send a switching signal to the zero-time switching unit to enable the zero-time switching unit to non-intermittently switch the energy storage unit connected to the electrical energy controller from the lithium ion battery to the lead acid battery, so that the current provided by the lead acid battery is transferred to the load, wherein the second preset voltage is the voltage of the lithium ion battery corresponding to 0% to 20% of the capacity of the lithium ion battery; and wherein the zero-time switching unit is configured to non-intermittently switch the energy storage unit connected to the electrical energy controller between the lithium ion battery and the lead acid battery.

5. The power supply device according to claim 4, wherein the electrical energy controller is connected to a load of a base station, the monitoring unit, and the zero-time switching unit;
the monitoring unit is connected to the zero-time switching unit and the lithium ion battery; and
the zero-time switching unit is connected to the lithium ion battery and the lead acid battery.

6. The power supply device, according to claim 5, wherein the load of the base station comprises a transceiver device, configured to receive or transmit a signal.

7. The power supply device according to claim 4 further comprising the power generation apparatus, configured to supply currents to the load.

8. The power supply device according to claim 7, wherein the power generation apparatus comprises:
a solar photovoltaic module, a wind power generation module, an oil machine power generation module, and/or a mains power supply module;

wherein the solar photovoltaic module is configured to generate currents using solar energy;
the wind power generation module is configured to generate currents using wind energy;
the oil machine power generation module is configured to generate currents using thermal energy from combustion of fuel; and
the mains power supply module is configured to receive currents supplied by the mains.

9. The power supply device according to claim 4, further comprising:
a battery management system (BMS), configured to protect the lithium ion battery, enable charge equalization of the lithium ion battery, and prevent the lithium ion battery from over-charge, over-discharge and over-temperature.

10. A base station, comprising:
a power supply device, configured to supply currents to a load of the base station to ensure normal running of the base wherein the load of the base station comprises a transceiver device, configured to receive or transmit a signal; and
a control device, configured to control the transceiver device to receive or transmit a signal;
wherein the power supply device, comprises:
a lead acid battery;
a lithium ion battery; and
an electrical energy control unit, configured to receive currents supplied by a power generation apparatus, distribute the currents supplied by the power generation apparatus to a load and the lithium ion battery to ensure normal running of the load and to enable the lithium ion battery to be charged, and when the lithium ion battery is fully charged, to distribute the currents supplied by the power generation apparatus to the lead acid battery so that the lead acid battery is charged;
wherein when the electrical energy control unit detects that the currents supplied by the power generation apparatus are interrupted, the electrical energy control unit is further configured to first transfer a current provided by the lithium ion battery to the load, and then transfer a current provided by the lead acid battery to the load when the lithium ion battery is exhausted:
wherein the electrical energy control unit comprises:
an electrical energy controller, configured to receive the currents supplied by the power generation apparatus, transfer currents required by the load among the currents to the load, and transfer remaining currents except the currents required by the load among the currents to the lithium ion battery so that the lithium ion battery is charged; and
a monitoring unit, configured to monitor a voltage of the lithium ion battery, and when the voltage of the lithium ion battery increases to a first preset voltage, send a switching signal to a zero-time switching unit connected to the lithium ion battery and the lead acid battery to enable the zero-time switching unit to non-intermittently switch an energy storage unit connected to the electrical energy controller from the lithium ion battery to the lead acid battery, and enable the electrical energy controller to transfer remaining currents to the lead acid battery so that the lead acid battery is charged, wherein the first preset voltage is the voltage of the lithium ion battery corresponding to 95% to 100% of the capacity of the lithium ion battery;
wherein the monitoring unit is further configured to monitor the currents supplied by the power generation apparatus, and when the currents supplied by the power generation apparatus are zero, send a switching signal to the zero-time switching unit to enable a zero-switching unit to non-intermittently switch the energy storage unit connected to the electrical energy controller from the lead acid battery to the lithium ion battery, so that the current provided by the lithium ion battery is transferred to the load;
wherein the monitoring unit is further configured to monitor the voltage of the lithium ion battery, and when the voltage of the lithium ion battery decreases to a second preset voltage, send a switching signal to the zero-time switching unit to enable the zero-time switching unit to non-intermittently switch the energy storage unit connected to the electrical energy controller from the lithium ion battery to the lead acid battery, so that the current provided by the lead acid battery is transferred to the load, wherein the second preset voltage is the voltage of the lithium ion battery corresponding to 0% to 20% of the capacity of the lithium ion battery; and
wherein the zero-time switching unit is configured to non-intermittently switch the energy storage unit connected to the electrical energy controller between the lithium ion battery and the lead acid battery.

11. The base station according to claim 10, wherein the electrical energy controller is connected to the load of the base station, the monitoring unit, and the zero-time switching unit;
the monitoring unit is connected to the zero-time switching unit and the lithium ion battery; and
the zero-time switching unit is connected to the lithium ion battery and the lead acid battery.

12. The base station according to claim 10, the power supply device further comprising the power generation apparatus, configured to supply currents to the load.

13. The base station according to claim 10, the power supply device further comprising:
a battery management system (BMS), configured to protect the lithium ion battery, enable charge equalization of the lithium ion battery, and prevent the lithium ion battery from over-charge, over-discharge and over-temperature.

14. The base station according to claim 12, wherein the power generation apparatus comprises a solar photovoltaic module, wherein the solar photovoltaic module is configured to generate currents using solar energy.

15. The base station according to claim 12, wherein the power generation apparatus comprises a wind power generation module, wherein the wind power generation module is configured to generate currents using wind energy.

16. The base station according to claim 12, wherein the power generation apparatus comprises an oil machine power generation module, wherein the oil machine power generation module is configured to generate currents using thermal energy from combustion of fuel.

17. The base station according to claim 12, wherein the power generation apparatus comprises a mains power supply module, wherein the mains power supply module is configured to receive currents supplied by the mains.

* * * * *